(No Model.)
H. MARSHALL.
FERTILIZER DISTRIBUTING ATTACHMENT FOR WAGONS.
No. 361,433. Patented Apr. 19, 1887.
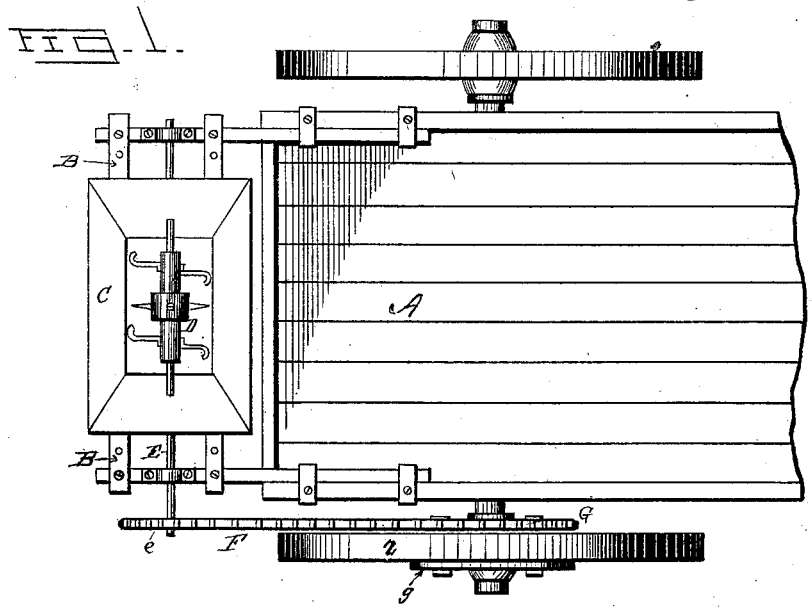
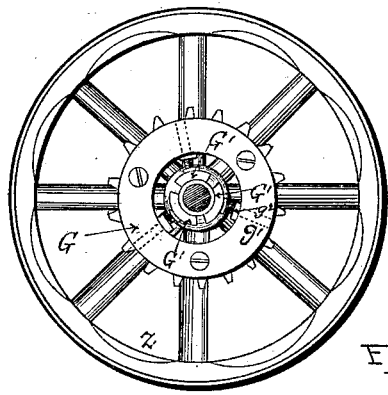
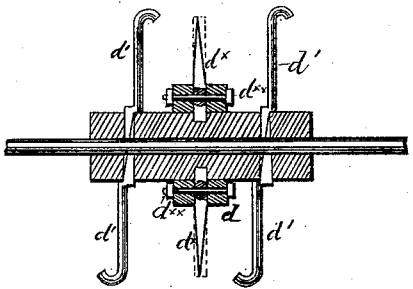
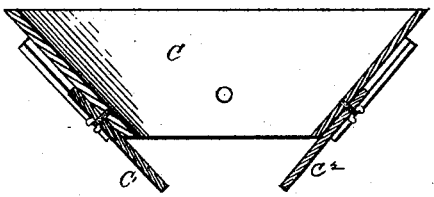
WITNESSES:
INVENTOR
Henry Marshall
BY
J. M. Kalb
ATTORNEY

UNITED STATES PATENT OFFICE.

HENRY MARSHALL, OF VALDOSTA, GEORGIA.

FERTILIZER-DISTRIBUTING ATTACHMENT FOR WAGONS.

SPECIFICATION forming part of Letters Patent No. 361,433, dated April 19, 1887.

Application filed December 19, 1885. Renewed January 22, 1887. Serial No. 225,820. (No model.)

*To all whom it may concern:*

Be it known that I, HENRY MARSHALL, a citizen of the United States, residing at Valdosta, in the county of Lowndes and State of Georgia, have invented certain new and useful Improvements in Fertilizer-Distributing Attachments for Wagons, Carts, and other Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to devices for scattering or distributing fertilizers of any and all varieties directly from the body of the wagon, cart, or other vehicle, in which they may be conveyed from the yard or other point to the field.

To carry my invention into practice, I have invented and devised a light adjustable frame so made and shaped as to enable it to fit any wagon or cart body, and placed in it a hopper or feed-chute having adjustable feed-boards on the side and a revoluble feed hub or wheel in the bottom opening. This hub or wheel is so formed as to be readily set in place, and has removable and reversible teeth and projecting hooked arms set with their curves or hooks turned in opposite directions on the opposite sides of the hub, so as to insure the proper and complete mixture and dissemination of the fertilizer and to insure against clogging and choking, as is so common in devices of this kind. This hub is mounted upon a transverse shaft, which has bearings in the frame, or in hangers attached thereto, and one end of the shaft is provided with a sprocket-wheel, over which works a sprocket-chain, which leads up to and engages with a sprocket-wheel placed on the inside of the spokes of the vehicle-wheel, and is secured therein a peculiar and novel manner. To effect this and adapt the parts to fit upon any sized hub, I provide a construction which shall have an adjustable bushing on the inside of the sprocket-wheel, and which shall not occupy any more space or in any way interfere with the proper working of the device.

The sprocket-wheel is held in place laterally on the hub by placing boards or stay-pieces on the opposite sides of the spokes and running both through, with nuts to draw the two sides tight upon the spokes. The sprocket-wheel is centered upon the vehicle hub, and caused to fit any hub by means of adjustable bushing-pieces placed in the enlarged eye of said wheel, with stems or rods extending radially out through the rim of the wheel. These rods are tightened by means of nuts set over them inside of the eye of the wheel and between the inner surface thereof and the bushing-blocks, so as not to interfere with the exterior rim of the wheel.

The fertilizer is placed in the hopper from the body of the wagon or cart, and by means of the devices described is thoroughly and evenly scattered over the ground.

The speed of the device is governed by the speed at which the vehicle is drawn over the ground.

The accompanying drawings illustrate what I consider the best means for carrying my invention into practice.

Figure 1 is a plan view of my device applied to a conveyance. Fig. 2 is a side elevation of wheel with adjustable sprocket-wheel. Fig. 3 is a central longitudinal section of feed-hub. Fig. 4 is a transverse section of hopper.

Similar letters of reference indicate corresponding parts in all the figures where they occur.

A is the body of the vehicle, of any style or form, whether two or four wheeled.

B is my adjustable frame, made, in the manner shown, so that its width may be adjusted in order to fit any width of bed. This adjustable character may be produced in any of the well-known ways of making adjustable frames as well as that shown.

In the frame is placed the hopper C, which is elongated in form and has the usual sloping sides. Near the bottom of this hopper is provided the feed hub or roller D, which will be presently particularly described. The sides of the hopper are provided with adjustable feed slides or gates $c'$ $c^2$, provided with set-screws or similar means for setting them, as desired to make a larger or smaller mouth in the hopper.

The feed hub or roller is formed in the shape substantially as shown, with an elevated rim or ring, $d$, in the center, and smaller true cylindrical ends. The central portion, $d$, has seats or sockets cut in it to receive the ends of the teeth $d^*$. These teeth are made square on their inner ends and set in the sockets in part $d$, and are there secured by transverse pins or bolts $d^{\times\times}$, passing through part $d$ and the ends of the teeth. The outer ends of the teeth are made tapering, as shown, in one direction, (or, if desired, in both,) and are preferably flat in the other direction. The teeth are removable from the hub, and may be set so as to present either the flat or thin side to the manure in the rotation of the hub.

The hub is held in place upon shaft E by means of radial bars or rods $d'$, run through the reduced end portions of the hub and through shaft E. The rods or bars $d'$ project out quite or nearly as far as the teeth $d^*$, and serve the double function of holding the hub on the shaft and of forming additional stirring and mixing means for the fertilizer. For this latter purpose they are provided with bent ends or hooks, as shown, which not only increase the capacity of the rods as stirrers and distributers, but also prevent the ends of the bars from tearing the sides of the hopper.

The shaft E, upon which the hub is secured, is provided at one end with a sprocket-wheel, $e$, over which works the linked belt or sprocket-chain F, which leads over a sprocket-wheel, G, secured on the inside of wheel Z of the wagon or cart. By means of this connection the shaft E is revolved, and the hub D is caused to tear up and scatter the fertilizer by the natural progression of the vehicle over the ground.

The sprocket-wheel G is secured upon wheel Z by bolts passing between the spokes, and secured by nuts on the outside of boards or stay-pieces $g$, placed outside of the spokes. The wheel G is centered upon the hub of the wagon or cart by means of movable or adjustable bushing-pieces G', placed in its enlarged eye, and provided with threaded rods or bolts extending out through the rim of wheel G. The bolts $g'$ are provided with nuts $g^2$, lying, preferably, between the bushing and the eye of the wheel G, by means of which the bushing is adjusted upon the hub, and the device made to fit any-sized hub and to be truly centered thereupon.

As thus constructed and applied, my device makes a useful farm implement, which can be used upon any size or form of wagon-bed or cart-body.

Having thus described my invention, what I desire to claim and secure by Letters Patent is—

1. In a fertilizer-distributer, the combination, with the receiving-hopper, of the shaft E, means for operating said shaft, as described, and distributing-hub consisting of the body, as described, the central enlargement, $d$, having the reversible teeth $d^*$ and securing-bolts $d^{\times\times}$ passing through said teeth, and the hooked teeth or prongs $d'$, inserted through the body of the hub at each end of the enlarged center portion, all substantially as and for the purpose set forth.

2. The combination, with the distributing-hopper, shaft, and hub, of the sprocket-chain F, sprocket-wheel $e$ on end of said shaft, and the removable wheel on the hub of the vehicle, consisting of the toothed rim G, having the bushings G' and screw-bolts $g'$, and nuts $g^2$, for tightening said bushings, the board or circle $g$ on the opposite side of vehicle-wheel, and bolts or screws, as described, for holding parts G and $g$ together, as set forth.

In testimony whereof I affix my signature in presence of two witnesses.

HENRY MARSHALL.

Witnesses:
 JOHN N. SLATER,
 D. C. ASHLEY.